United States Patent [19]

Witte

[11] 4,432,286

[45] Feb. 21, 1984

[54] COMBUSTION PINHOLE CAMERA SYSTEM

[75] Inventor: Arvel B. Witte, Rolling Hills, Calif.

[73] Assignee: The United States of America as represented by the United States Department of Energy, Washington, D.C.

[21] Appl. No.: 379,798

[22] Filed: May 19, 1982

[51] Int. Cl.³ .............................................. F23N 5/24
[52] U.S. Cl. .................................... 110/193; 110/185; 358/100; 431/13
[58] Field of Search ............... 110/193, 185, 191, 349; 431/13; 126/200; 358/100

[56] References Cited

U.S. PATENT DOCUMENTS

| | | | |
|---|---|---|---|
| 2,388,124 | 10/1945 | Crews | 110/185 |
| 3,021,386 | 2/1962 | Clark | 431/13 X |
| 3,075,577 | 1/1963 | Cazalas | 431/13 |
| 3,477,823 | 11/1969 | Freiday | |
| 3,936,196 | 2/1976 | Wickersheim | 126/200 |

FOREIGN PATENT DOCUMENTS 1218733  1/1971  United Kingdom ................. 431/13

OTHER PUBLICATIONS

Report S/N 34731, "Coal Combustion Aerothermochemistry Research" Witte et al., Dec. 15, 1980.

Primary Examiner—Edward G. Favors
Attorney, Agent, or Firm—L. E. Carnahan; Roger S. Gaither; Michael F. Esposito

[57] ABSTRACT

A pinhole camera system utilizing a sealed optical-purge assembly which provides optical access into a coal combustor or other energy conversion reactors. The camera system basically consists of a focused-purge pinhole optical port assembly, a conventional TV vidicon receiver, an external, variable density light filter which is coupled electronically to the vidicon automatic gain control (agc). The key component of this system is the focused-purge pinhole optical port assembly which utilizes a purging inert gas to keep debris from entering the port and a lens arrangement which transfers the pinhole to the outside of the port assembly. One additional feature of the port assembly is that it is not flush with the interior of the combustor.

15 Claims, 2 Drawing Figures

COMBUSTION PINHOLE CAMERA SYSTEM

BACKGROUND OF THE INVENTION

The invention described herein arose in the course of, or under, Contract No. DE-AC01-79ER10029 between TRW, Incorporated and the U.S. Department of Energy.

This invention relates to an apparatus for viewing the interior of a combustor or energy conversion reactor, particularly to a combustor pinhole camera system, and more particularly to a focused-purge pinhole optical port assembly for use with a pinhole camera.

Optical access through ports is often desirable to photograph or otherwise diagnose a combustor or other energy conversion reactors. The flows within such combustors are normally two phase and/or heated flows which can deposit condensate or debris on the port or window so as to obscure the view within a few minutes of operation. A common way of trying to keep the window or port clear is by a clean gas purging the side of the window in contact with the combustor gases. Usually these purge requirements become very large, at least for coal combustors, and may disturb the mass, momentum and energy flow within the system.

These prior port and purging approaches are exemplified by U.S. Pat. Nos. 3,021,385 issued Feb. 13, 1962 to H. R. Summerhayes, Jr. et al.; 3,021,386 issued Feb. 13, 1962 to R. J. Clark; 3,477,823 issued Nov. 11, 1969 to J. H. Freiday; and 3,609,236 issued Sept. 28, 1971 to W. H. Heilman.

In view of the recent efforts directed to the development of more efficient coal combustors, for example, a need exists for an effective apparatus to enable monitoring of the combustion without creating flow disturbances.

Therefore it is an object of this invention to provide an apparatus for observing or monitoring combustion phenomena.

A further object of the invention is to provide a combustor pinhole camera system.

Another object of the invention is to provide a focused-purge pinhole optical port for using in a pinhole camera system utilized in observing combustion phenomena.

Another object of the invention is to provide an apparatus for observing combustion phenomena within a combustor while minimizing flow disturbances within the combustor.

Other objects of the invention will become readily apparent from the following description and accompanying drawings.

SUMMARY OF THE INVENTION

The present invention fulfills the above objects by providing a combustor pinhole camera system which utilizes a focused-purge optical port assembly. The port assembly provides for purging of the pinhole while minimizing flow disturbances and includes a plural lens arrangement which transfers the pinhole to the outside of the assembly where the open aperture vidicon receiver sees the aperture. The optically focused and gas purged pinhole port assembly forms a sealed unit separated from and not in contact with the camera. Note that the port assembly is not flush with the interior wall of the combustor but protrudes thereinto. The gas purge is relatively small and yet is sufficient for its intended purpose and does not disturb the mass, momentum, and energy flow within the combustor.

DETAILED DESCRIPTION OF THE INVENTION

The present invention is directed to a combustor pinhole camera which utilizes an optically focused and gas purged pinhole port formed as a sealed unit separated from and not in contact with the camera. The system is utilized for viewing the interior of a combustor, such as a coal combustor, or other type of reactor where it is desirable to view or monitor combustion with minimum flow disturbances within the combustor.

The pinhole camera incorporates three components: (1) a focused-purge pinhole optical port, which alleviates the problems of keeping the viewing window clean without disrupting conditions within the combustor, (2) a conventional TV vidicon receiver to view and record the observed phenomena with the combustor, and (3) an external, variable density light filter arrangement which is coupled electronically to the vidicon automatic gain control (agc) to extend the dynamic range of the system as well as protect the vidicon from burnout. Items (2) and (3) above may be replaced by some other device, such as an emission radiation monitor, a laser beam absorption experiment, or a sodium D-line reversal instrument to measure temperature. However, item (1) is a key component for use with items (2) and (3) or replacement apparatus.

The focused-purge pinhole optical port of this invention provides, from an aerodynamics point of view, the purge of clean nitrogen gas which repels not only combustion gases but also any debris from entering the port. Thus all optics are kept clean. The two lenses in the FIG. 1 embodiment simply tranfer the pinhole to the outside of the assembly where the open aperture vidicon sees a pinhole aperture. A key feature of the invention is in the purged-optical port assembly being inserted a small distance into the combustor so that it is not flush with the inner wall of the combustor. This feature helps particularly by separating molten slag flowing on the wall from the port region.

The embodiment illustrated has been verified by tests wherein the camera was installed on both the end and slag trap parts of the combustor. In these positions, real time observations of combustion phenomena were made on: (1) slag motion on walls, (2) coal sheet ignition, and (3) slag capture. For further information regarding details of the pinhole camera for use in a pulverized coal combustor, not described hereinafter, attention is directed to report S/N 34731, "Coal Combustion Aerothermochemistry Research", by A. B. Witte et al., Appendix A, released for publication on June 3, 1982, prepared by TRW, Incorporated, Redondo Beach, Calif. During these tests, it was verified that by positioning the end of the pinhole port assembly such that it extended into the combustor provided significant results over positioning it flush with the combustor wall.

Figure 1:
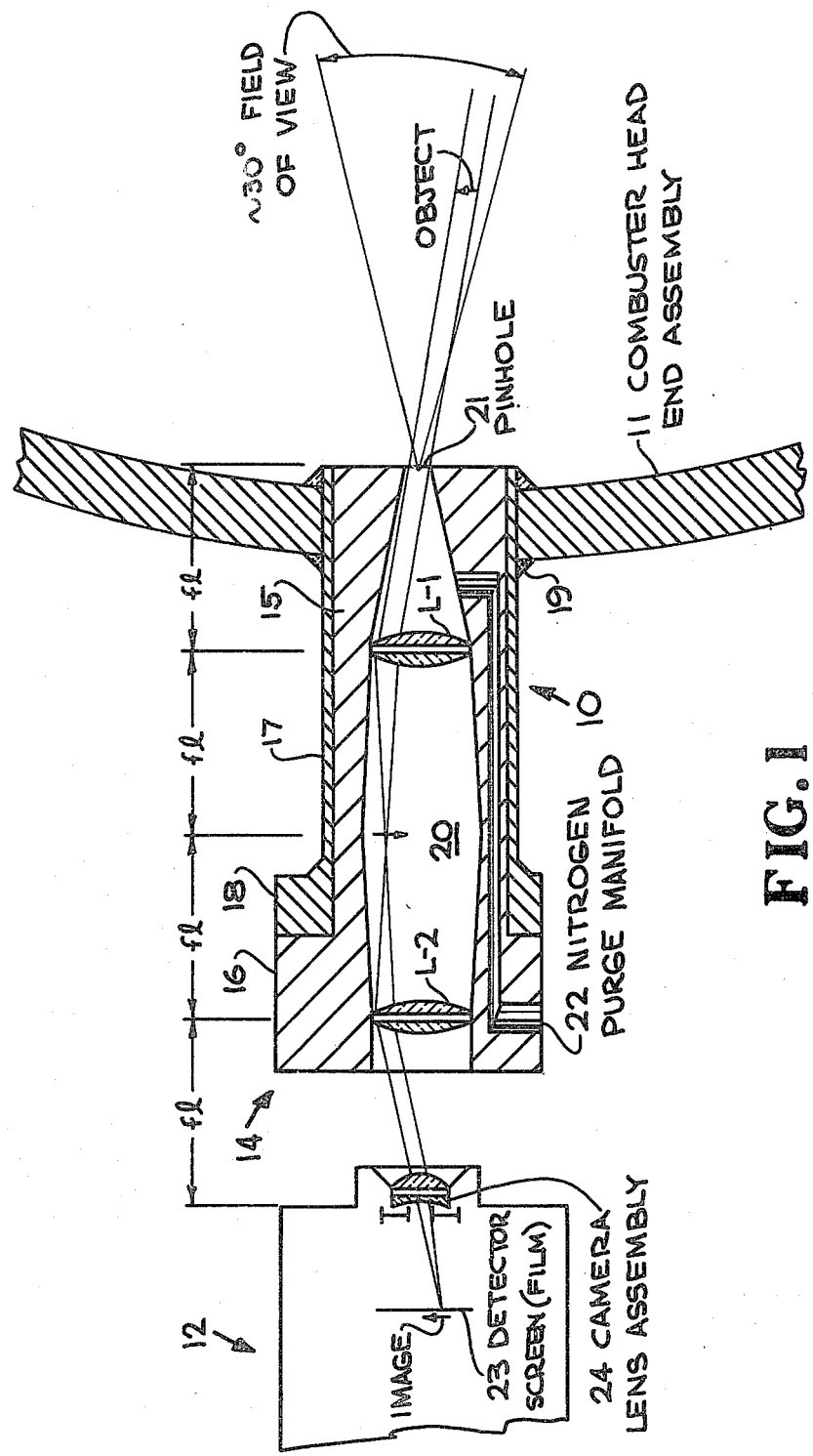
FIG. 1 illustrates an embodiment of a pinhole camera made in accordance with the invention.

Referring now to the drawings, the embodiment of FIG. 1 illustrates the focused-purge pinhole port assembly, generally indicated at 10, secured in a combustor head end assembly 11. A camera section, generally indicated at 12 is shown schematically, with the filter arrangement located between the camera and the pinhole port assembly being omitted, but illustrated schematically in FIG. 2 and generally indicated at 13. In the embodiment illustrated the pinhole port assembly 10 may, for example, for 12 cm long with a major diameter of 5 cm and minor diameter of 2 cm. The overall distance from the end of assembly 10 to the camera 12 is equal to four (4) focal lengths (fl) of a lens within assembly 10. the pinhole port assembly may be inserted about 2.54 cm into the combustor, for example.

The pinhole port assembly 10 consists of a body member of housing 14 having sections 15 and 16 of different diameters and a sleeve 17 having a flange 18 extending around housing section 15 and abutting housing section 16. Housing section 15 and sleeve 17 extend into and are secured, as indicated at 19, such as by welding, to combustor head end assembly 11. Housing 14 is provided with a converging-diverging opening or chamber 20 forming a pinhole or orifice 21 at one end. A pair of lenses L-1 and L-2 are positioned with opening 20. A purge manifold or passageway 22 is provided in housing 14 and extends from housing section 16 along housing section 15 and terminates in opening 20 between orifice 21 and lens L-1. Purge manifold 22 is adapted to be connected to a supply of pressurized gas, such as nitrogen, not shown.

The lens L-1 is located a focal length (fl) from the pinhole or orifice 21, with lens L-2 located two focal lengths from lens L-1. For example, the diameter of each lens L-1 and L-2 is 12 mm with an fl of 31 mm; the diameter of orifice 21 is 2 mm, the resolution is 0.5 mm, and the field of view is 30°. Lens L-1 accepts semiparaxial rays from an object within the field of view and relays them through the lens to a focal point between lens L-1 and lens L-2. Because the rays are paraxial they are brought to a focus at a distance equal to the focal length of the lens. Note, however that the directions of the received rays from an extreme off axis angle are collimated somewhat parallel to the axis of the centerline of the system. All rays entering the pinhole or orifice 21 are generally made to go parallel to the axis.

The lens L-2 takes the rays, collimated from lens L-1, and converges them to an image 23 of the combustor pinhole 21 in camera 12 via a camera lens assembly 24 located at a focal length from lens L-2. Note that the rays passing through the image 23 of the pinhole have now become paraxial because they have been taken from a place at the focal length of lens L-2.

Figure 2:
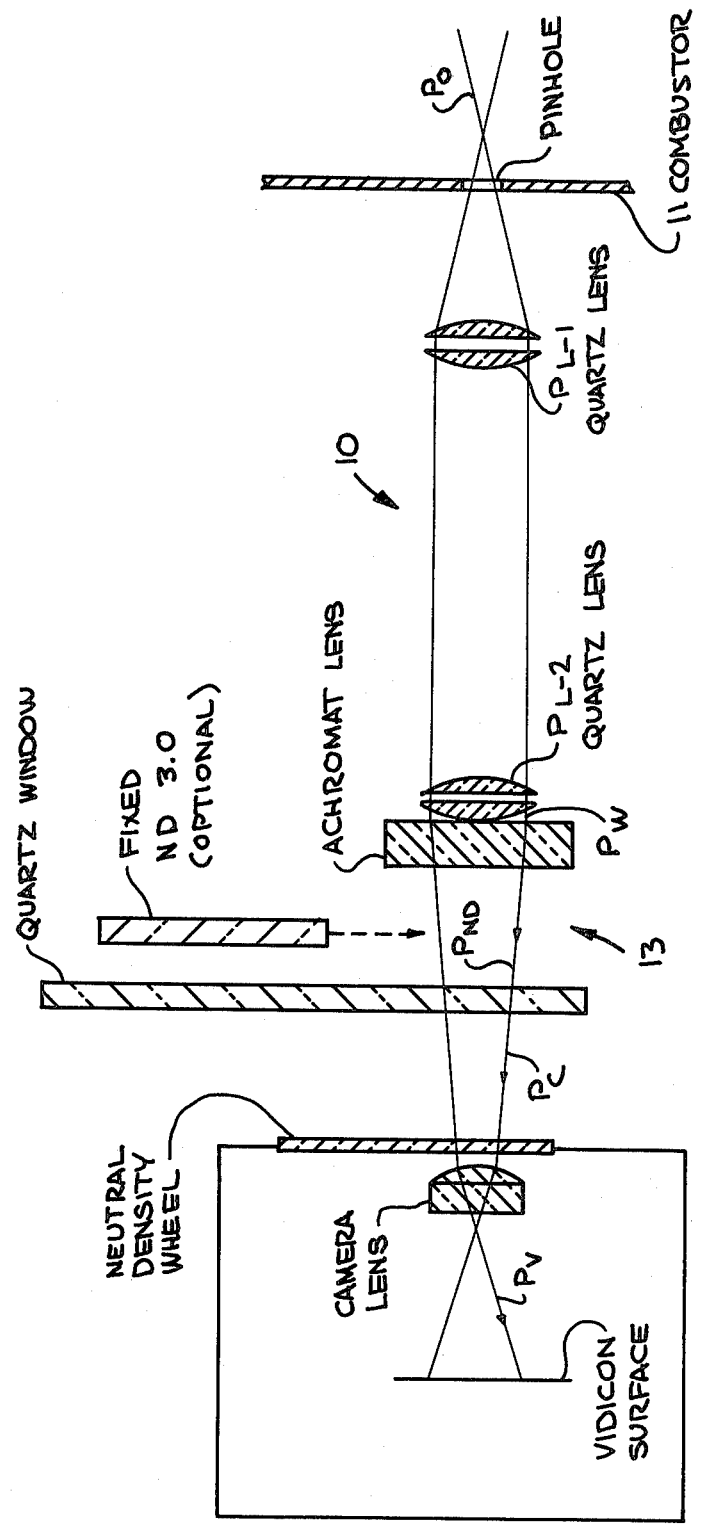
FIG. 2 is an optical block diagram of the FIG. 1 embodiment.

It is thus seen, as shown in FIG. 1, that if lens L-1 and lens L-2 are identical, lens L-1 is located a focal length from pinhole or orifice 21, lens L-2 is separated from lens L-1 by two times the focal length, and the camera lens assembly 23 is one focal length from lens L-2. This arrangement then provides a wide field of view, and the camera is located external to the combustor wall and its focus is set for the distance from the combustor wall to the region of interest. As seen in FIG. 2, positioning a filter arrangement 13 between lens L-2 and camera lens assembly 24 changes the focal points.

FIG. 2 illustrates an optical block diagram of the FIG. 1 apparatus including the filter section 13. It is believed that FIG. 2 is self-explanatory in view of the legends thereon and further description is deemed unnecessary.

Purging inert gas, such as nitrogen, argon and helium, directed through manifold 22 and outwardly through pinhole (orifice) 21 provides an aerodynamic window which keeps the optics (lens L-1) clean and, of course, in a remote position relative to the combustion gases and particulates. The focused geometry of the chamber 20 forms a convergent nozzle, terminating as pinhole 21, which provides a large momentum flux of purge at the pinhole 21 to repel particles without using large amounts of gases which may dilute or disturb the combustion processes.

These same purge gases help cool the pinhole port assembly 10. Additional water cooling may also be provided adjacent the sleeve 17.

Details of the camera section 12 are not deemed essential to an understanding of the invention since it is a conventional TV video unit with the primary components thereof being indicated by legend in FIG. 1. Similarly, the various components of the filter arrangement 13 are conventional and thus a detailed description thereof is not believed essential to provide an understanding of the invention.

It has thus been shown that the present

It has thus been shown that the present invention provides an improved pinhole camera system for observing the reaction phenomena within a combustor, for example. The improvement provided by the invention resides primarily in a sealed focused-purge pinhole optical port assembly, whereby condensate or debris deposits at the pinhole are eliminated and the optics are retained in a clean condition. By use of the pinhole optical port assembly, the pinhole image is transferred to a location external of the assembly where it can be readily picked up by a conventional TV camera or other associated equipment.

While a particular embodiment of the invention has been illustrated and described, modifications will become apparent to those skilled in the art, and it is intended to cover in the appended claims all such modifications as come within the scope of the invention.

What is claimed is:

1. In an apparatus for observing reactions within a closed chamber via an externally located viewing means, the improvement comprising:
   an optically focused and gas purged pinhole port assembly,
   said pinhole port assembly being adapted to be mounted in an associated chamber to be observed and aligned with an associated viewing means,
   said pinhole port assembly being adapted to be mounted in an associated chamber such that a portion of said assembly extends into an interior of an associated chamber so as not to be flush with an inner wall surface of such an associated chamber,
   said pinhole port assembly including a housing having an opening extending therethrough with a plurality of spaced optical means and gas purging means located so as to direct purging inert gas through one end portion of said opening from between one of said plurality of spaced optical means and an associated chamber,
   said optical means functioning to transfer an image of an object in an associated chamber to a point external of said pinhole port assembly for viewing by an associated viewing means.

2. The improvement defined in claim 1, wherein said opening extending through said housing is of a diverging-converging configuration, said plurality of spaced optical means being located within said diverging-converging opening, one of said optical means being positioned in the converging configured section of said opening and spaced from one terminal end of said opening so as to define a converging nozzle, said gas purging means being operatively connected with said converging nozzle, whereby purging gas passes through said converging nozzle and outwardly through said terminal end of said opening preventing deposit of undesired matter in said terminal end and on said optical means.

3. The improvement defined in claim 2, wherein said plurality of spaced optical means comprises a pair of substantially identical lenses spaced apart at a distance of two focal lengths of one of said lenses.

4. The improvement defined in claim 3, wherein one of said pair of lenses is located at a distance of one focal length from said one terminal end of said opening in said housing.

5. The improvement defined in claim 2, wherein said one terminal end of said opening in said housing forms a pinhole of a desired cross-section, said pinhole being mounted in a protruding location in an interior of an associated chamber to be observed.

6. The improvement of claim 1, wherein said purging inert gas is composed of nitrogen.

7. In combination with a combustion chamber having a pinhole therein for viewing the interior thereof, a viewing mechanism for observing reaction phenomena within said combustion chamber, and means positioned between said combustion chamber and said view mechanism for transferring said pinhole to a location external of said combustion chamber, said means protruding into an interior section of said combustion chamber, said means comprising a focused-purge pinhole optical port assembly mounted in said pinhole of said combustion chamber and spaced from but in alignment with said viewing mechanism, said optical port assembly comprising a housing having an opening extending therethrough and having a terminal end of said opening located in said combustion chamber, a plurality of lenses positioned in spaced apart relation in said opening, and gas purging means connected adjacent said terminal end of said opening for directing purging gas into one end portion of said opening and outwardly from said terminal end of said opening.

8. The combination of claim 7, wherein said one end of said opening is configured to form a converging nozzle.

9. The combination of claim 8, wherein at least a portion of said converging nozzle is positioned to protrude into the interior of said combustion chamber.

10. The combination of claim 7, wherein said viewing mechanism includes a TV vidicon receiver.

11. The combination of claim 7, additionally including a filter arrangement interposed between said viewing mechanism and said optical port assembly.

12. A focused-purge pinhole optical port assembly adapted to be mounted in an opening in a chamber to be viewed by an associated viewing mechanism, said optical port assembly comprising:

a housing having an opening extending longitudinally therethrough which includes a converging section which terminates at one end of said opening forming a pinhole in said housing, a pair of spaced optical means located in said opening, one of said optical means being positioned in said converging section of said opening and at a distance of one focal length thereof from said pinhole, and means for directing a purging inert gas into said converging section of said opening intermediate said one optical means and said pinhole and outwardly through said pinhole for preventing deposit of undersired matter in said opening and on said one optical means, whereby an image of an object viewed at said pinhole is transferred by said pair of optical means to a point exterior of said housing for viewing by an associated viewing mechanism.

13. The optical port assembly of claim 12, wherein said purging inert gas is selected from a group consisting of nitrogen, argon and helium.

14. The optical port assembly of claim 12, wherein said purging gas means utilizes nitrogen gas.

15. The optical port assembly of claim 12, in combination with a coal combustor which constitutes said chamber to be viewed, and wherein at least a portion of said converging section of said opening in said housing protrudes a distance into said coal combustor.

* * * * *